INVERTERS

Filed Sept. 21, 1961 4 Sheets-Sheet 1

United States Patent Office 3,213,287

Patented Oct. 19, 1965

3,213,287

INVERTERS

Kenneth G. King, London, England, assignor to Westinghouse Brake and Signal Company Limited, London, England Filed Sept. 21, 1961, Ser. No. 139,661
Claims priority, application Great Britain, Nov. 30, 1960, 41,112/60; May 11, 1961, 17,185/61
5 Claims. (Cl. 307—71)

This invention relates to inverters which incorporate controllable semi-conductor rectifiers arranged to be switched on and off at various intervals in order to control the connection of a direct current supply to a load.

In a parallel inverter producing a square or stepped output waveform, it is customary to achieve commutation (i.e. the switching-off of those rectifiers which are conducting before, or during the course of, the firing of other rectifiers), by means of a capacitor connected in parallel with the load so that the charge accumulated in the capacitor is applied in reverse polarity to a rectifier which is conducting to switch it off.

This arrangement has been found undesirable in certain applications due to the presence of the capacitor across the load, and it is an object of the present invention to provide an improved inverter in which this effect is largely reduced or eliminated.

The present invention consists in an inverter in which a number of controllable semi-conductor rectifiers are connected in an arrangement to which a direct current supply may be connected and from which an output may be taken, switching means being provided for periodically charging a capacitor and then connecting the charged capacitor to the input of the arrangement so as to apply a pulse of opposite polarity to that of the direct current supply so that all rectifiers in the arrangement in a conducting state at that instant are switched off. Preferably the rectifiers are arranged in the form of a bridge network.

The invention further consists in an inverter as set forth in the preceding paragraph, wherein the switching means is arranged so that the condenser may be charged from the direct current supply, the polarity of the charge being reversed by the action of a resonant circuit before being applied to the input of the arrangement.

Figure 1:
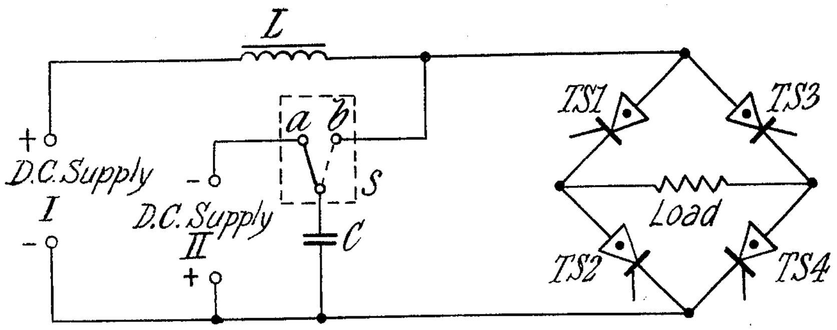
Figure 2:
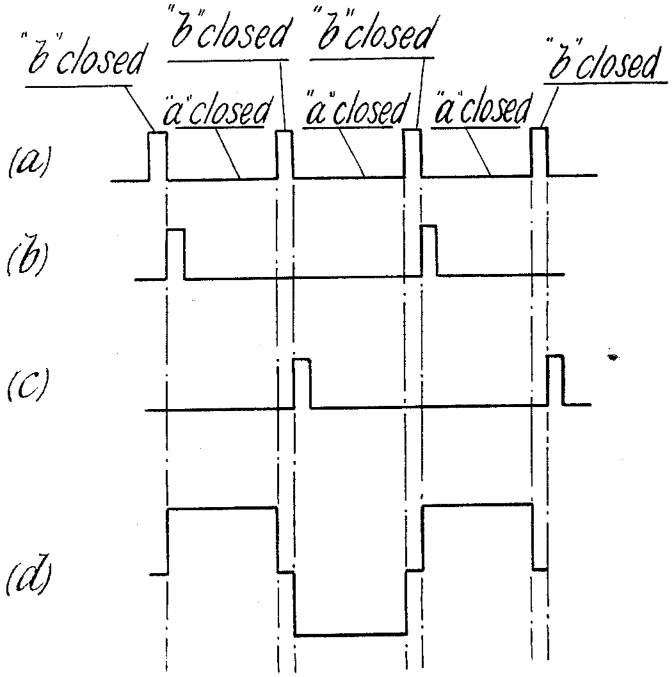
Figure 3:
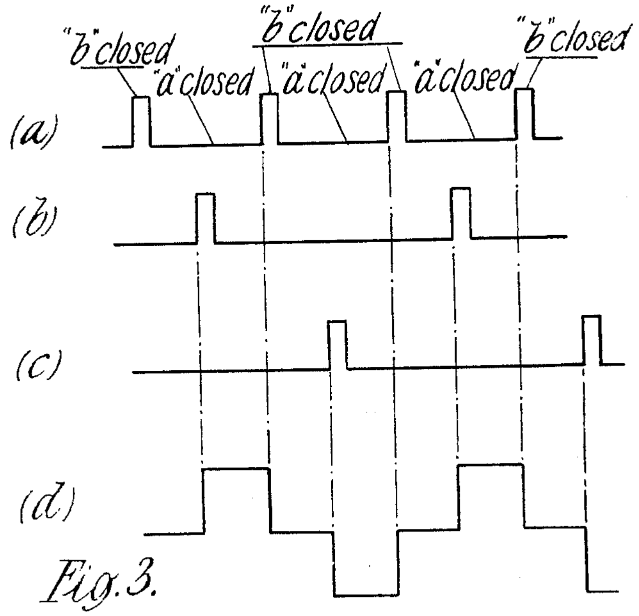
Figure 4:
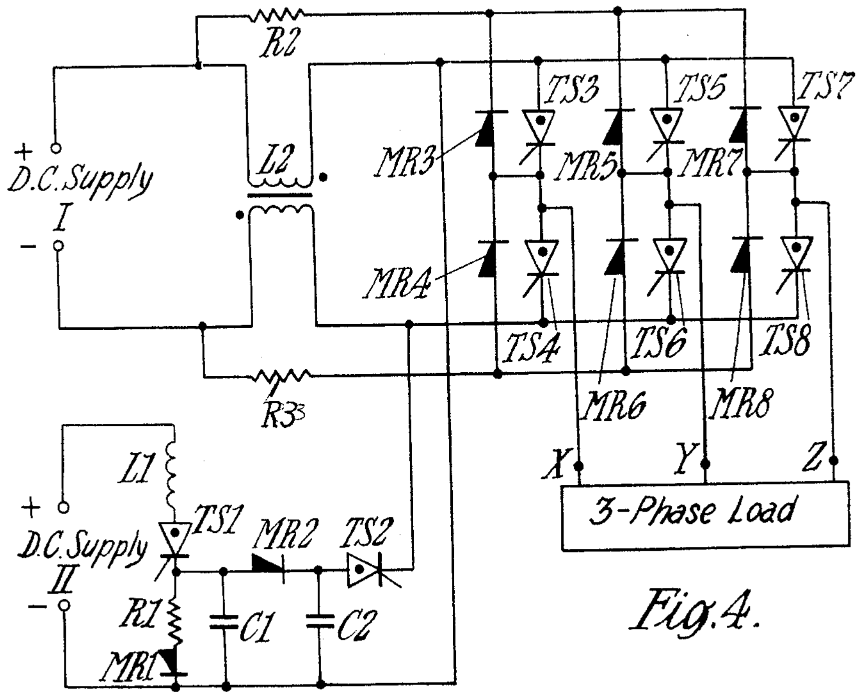
Figure 5:
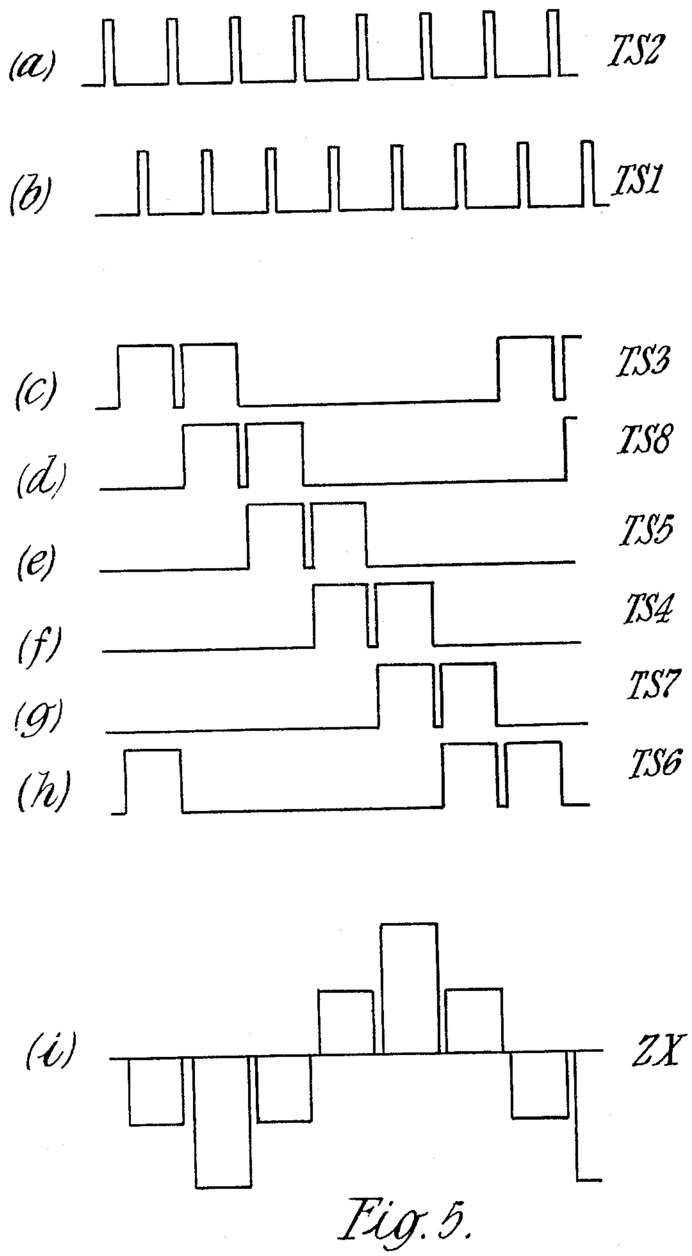
Figure 6:
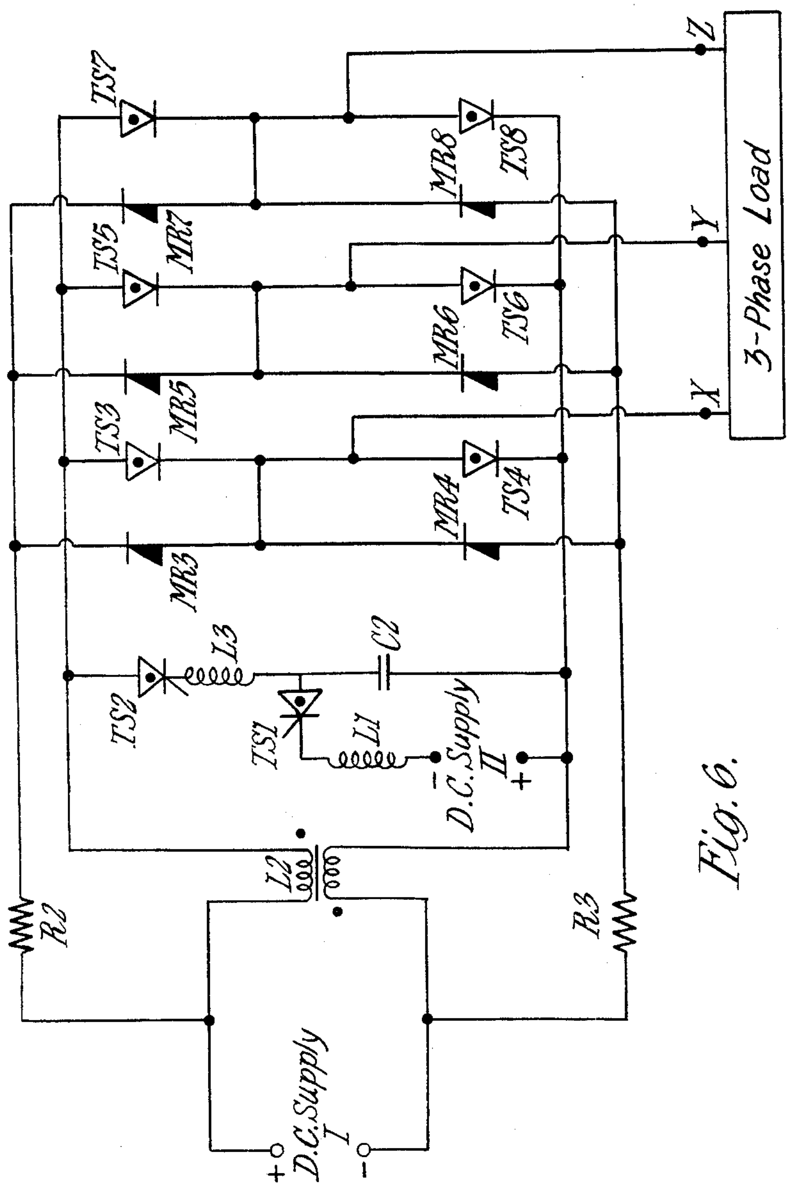

In the accompanying drawings:

FIGURE 1 shows diagrammatically one form of inverter according to the present invention, FIGURE 2 shows various waveforms associated with FIGURE 1, FIGURE 3 shows alternative waveforms to those of FIGURE 2, FIGURE 4 shows diagrammatically an alternative form of inverter according to the present invention, FIGURE 5 shows various waveforms associated with FIGURE 4, and FIGURE 6 shows diagrammatically a modified form of the inverter shown in FIGURE 4.

In carrying the invention into effect according to one convenient mode by way of example, a single-phase bridge inverter for a resistive load is shown in FIGURE 1 in which S is intended to represent diagrammatically any suitable switching circuit which will normally include a number of semi-conductor switching devices.

A direct current supply I is connected through an inductor L to four controllable rectifiers TS1, TS2, TS3 and TS4 arranged in the form of a bridge. Suitable means, not shown, are provided for firing alternately rectifiers TS1 and TS4 or TS2 and TS3, in known manner. A condenser C is arranged by means of the switching circuit to be connected either to a second direct current supply II or across the two corners of the bridge to which the direct current supply I is applied. A load is connected between the other two corners.

The operation of the circuit is shown in FIGURE 2 in which (*a*) shows the operation of the switching circuit, (*b*) the firing pulses applied to TS1 and TS4, (*c*) the firing pulses applied to TS2 and TS3 and (*d*) the output voltage developed across the load.

It will be seen that as the switching circuit S switches over to *a* to connect the condenser C for charging by the D.C. supply II, firing pulses are applied to rectifiers TS1 and TS4 (FIGURE 2*b*) so that current flows from D.C. supply I, through inductor L, and rectifier TS1 to the load, returning through rectifier TS4.

When switching circuit S is next switched over to *b*, the flow of current from D.C. supply I is interrupted by the application of the charge of reverse polarity from the condenser C to the rectifiers TS1 and TS4 to switch them off.

Firing pulses are then applied to rectifiers TS2 and TS3, shown in FIGURE 2*c*, so that current flows again from D.C. supply I, but this time in the reverse direction. This current is then interrupted in similar manner when the switching circuit S next switches over to *b* to apply a charge of reverse polarity from the condenesr C to the rectifiers TS2 and TS3 to switch them off.

This sequence is repeated cyclically, as will be seen from the drawings, so that an alternating voltage (FIGURE 2*d*) is applied to the load.

The circuit described above has the following advantage over those circuits in which a condenser is connected directly across the load for commutation.

(i) The capacitor is not in parallel with the load and therefore cannot cause self-excitation of the load, as may happen, for example, with induction motors.

(ii) The commutating effect depends upon the charge on the capacitor and is therefore independent of load conditions.

(iii) The capacitance of condenser C may be reduced independently of D.C. supply I, by increasing the voltage of D.C. supply II.

(iv) Where the inverter is adapted for polyphase operation, a single capacitor will still suffice regardless of the number of branches in the load.

A further advantage is that by varying the phase of operation of the switching circuit S in relation to the firing pulses to the rectifiers, it is possible to vary the duration of the conducting periods of the rectifiers and thus the mean output voltage may be varied. This is shown in FIGURE 3 which corresponds to FIGURE 2 except that the duration of the flow of current through the load in each half-cycle has been reduced, thereby reducing the mean output voltage.

In practice, the switching circuit S may take the form of a pair of controlled rectifiers in the charging and discharging circuits respectively, the rectifiers being arranged in the manner described in U.S. patent specification No. 909,020.

Where it is desired to use the inverter according to the invention with a load which is appreciably inductive, then the following modifications may be required.

(i) Additional rectifiers to provide a path for reactive current in the load when the controlled rectifiers are switched off. By duplicating the inductor L, or by using a double-wound choke, it is possible to feed back reactive power to the D.C. supply.

(ii) The firing pulses should be extended since the controlled rectifiers can only be fired when load current conditions permit.

FIGURE 4 shows a three-phase bridge inverter according to the present invention which includes a controllable rectifier charging and discharging circuit for the condenser and a rectifier arrangement for feeding back reactive power from an inductive load connected to XY and Z. The phase relationships between various waveforms in the inverters of FIGURE 4 are shown in FIGURE 5 in which (*a*) to (*h*) represents the firing pulses applied to various rectifiers as shown, and (*i*) represents the output voltage across the two outer load terminals X and Z. In this method of firing there are six different patterns of conduction of the rectifiers which produce under ideal conditions the output waveforms voltage shown at (*i*). In practice, this will also include transients which are normally present, particularly with an inductive load.

The mechanism of switching with an inductive load is as follows.

If rectifiers TS3 and TS8 are initially conducting, then the full supply voltage is applied across the load terminals XZ, and terminal Y is at a potential midway between that of X and Z assuming the load to be balanced.

If now TS2 is fired, C2 having been charged from D.C. supply II, the voltage applied to the input of the bridge is momentarily reversed. The current which was flowing in the load from X to Z cannot immediately cease due to the inductance of the load, and an E.M.F. is induced in the load in a direction to maintain the current flow, terminal Z therefore becoming positive with respect to X.

In the absence of the feedback rectifiers MR3–8, this E.M.F. would in many cases be sufficient to overcome the charge upon the capacitor C2 and maintain the flow of current through TS3 and TS8 thus preventing the latter from being switched off.

However, with the arrangement shown, as soon as the E.M.F. generated by the load exceeds the voltage of the D.C. supply I, the load current switches to rectifiers MR7 and MR4, the rectifiers TS3 and TS8 can be switched off.

Following this, rectifiers TS5 and TS8 are fired and the reversal of current at terminals X–Y of the load, which this new conduction pattern implies, cannot occur immediately but is achieved in due course as long as the firing pulses are extended as shown.

Resistors R2 and R3 are not essential, but they seem to assist commutation. In general, the voltage of D.C. supply II should be higher than that of D.C. supply I. If desired, the double wound choke L2 may be replaced by two single-wound chokes, each taking the place of one winding of L2.

FIGURE 6 shows a modified form of the three-phase bridge inverter just described with reference to FIGURE 4, and again includes a controllable rectifier charging and discharging or switching circuit TS1, TS2 for the condenser C2 and a rectifier network arrangement TS3–TS8, MR3–MR8 for feeding back reactive power from an inductive three-phase load connected to X, Y and Z.

The phase relationships between the various waveform in the inverters of FIGURE 6 are similar to those shown in FIGURE 5 but the switching circuit employed to control the charging and discharging of condenser C2 differs from that in FIGURE 4.

In FIGURE 6 the condenser C2 may be charged either from the auxiliary direct current supply II via inductor L2, TS2 and inductor L3 when, for example, the direct current supply II is reduced to zero.

As is FIGURE 4, the resistors R2 and R3 may be included in the circuit of FIGURE 6 to assist in commutation, and in general it is convenient to arrange for the voltage of D.C. supply II to be higher than that of D.C. supply I.

When the auxiliary direct curently supply II is being used, condenser C2 is charged from the supply II by firing rectifier TS1 and discharged by firing rectifier TS2, at appropriate instants.

However, when the direct current supply II is reduced to zero, condenser C2 may be charged from supply I by firing rectifier TS2, and then firing rectifier TS1 so that the charge on condenser C2 is reversed by the effect of the resonant circuit including L1 and C2. Subsequent firing of rectifier TS2 then applies the reversed charge to the input of the arrangement, after which the condenser C2 is again charged to the polarity of the supply 1 in readiness for reversing the polarity of its charge one more.

It will be appreciated that the invention is not limited to inverters having rectifiers arranged in the form of a bridge network, as shown by way of example in the drawings, since the invention is equally applicable to transformer-coupled inverters.

If desired, an electrical centre point of the direct current supply may be made available as a neutral point for the alternating current output, thereby making available any desired number of phases. For example, the provision of such a central point in the circuit shown in FIGURE 4, would permit rectifiers TS3 and TS4 only to be used in a single-phase inverter, with the load connected between terminal X and the centre point, and rectifiers TS3, TS4, TS5 and TS6 only to be used in a two-phase inverter, with the load connected between terminals X and Y and the centre point.

In circuits such as shown in FIGURE 4, additional diodes may be connected so as to by-pass currents circulating through L2, TS3, TS5, TS7, MR3, MR5, MR7 and R3, and through L2, TS4, TS6, TS8, MR4, MR6, MT8 and R3. In the circuit shown in FIGURE 4, these additional diodes would be connected one between the right-hand end of R2 and the common connection of TS3, TS5 and TS7, and the other between the right-hand end of R3 and the common connection of TS4, TS6 and TS8. The purpose of these additional diodes is to reduce the current required of the main controllable and feedback rectifiers.

The number of commutations per cycle is not prescribed. For example, in the circuit of FIGURE 4 although there are, in the mode of operation described, six main steps in each cycle, each of these steps may be subdivided into a number of discrete conduction periods defined by the same number of commutations, and the duty-cycle or on-off ratio of these conduction periods may be varied by the introduction of a variable delay after each commutation, in a manner analogous to that shown in FIGURE 3, in order to vary the mean output voltage of the inverter.

Any number of phases may be generated by the inverter, and a large number of phases may be combined into a smaller number, for example six into three, in order to obtain a closer approximation to a sine wave.

I claim:

1. An inverter comprising a plurality of controllable semiconductor rectifiers, means interconnecting said rectifiers to form a network, an input to said network and an output from said network, a load connected to said output, a main direct current supply and an auxiliary direct current supply, a capacitor, and switching means including the power supplies for periodically charging said capacitors, and for thereafter connecting the charged capacitor to the input of the network for thereby applying a pulse to said input of opposite polarity to that of the main direct current supply such that all rectifiers in the network in a conducting state at that instant are switched off and a supply is fed from the output of said network to the load.

2. The inverter as recited in claim 1, including means for varying the phase of operation of said switching means in relation to the switching on of said rectifiers in the network such that the output thereof may be varied.

3. The inverter as recited in claim 1, including additional rectifiers connected in said network between the load and the main direct current supply to thereby provide a path for any reactive current in the load when the controllable rectifiers are switched off.

4. An inverter comprising a plurality of controllable semiconductor rectifiers connected in a bridge network, an input to said bridge network and an output from said bridge network and a load for connection to said output, at least one direct current supply, a capacitor, and switching means for periodically charging said capacitor at least in part from said direct current supply, resonant circuit means for reversing the polarity of the capacitor charge and for thereafter connecting the charged capacitor to the input of the brige network by said switching means as a pulse of oppoiste polarity to that of the said direct current supply such that all rectifiers in the bridge network in a conducting state at the instant are switched off and an inverted supply is fed from the output of said bridge network to the load.

5. An inverter comprising a number of controllable semiconductor rectifiers, means interconnecting said rectifiers in a bridge network, an input and an output to said bridge network, a load connected to said output, a first direct current supply and a second direct current supply, a capacitor, switching means for periodically charging said capacitor from said current supplies and for then connecting the charged capacitor to the input of the bridge network, means for varying the phase of operation of said switching means in relation to the switching on of said controllable rectifiers in the network, resonant circuit means for reversing the polarity of the capacitor charge, the switching means applying a pulse from said capacitor after such reversal to the input of said network of opposite polarity to that of the first charging direct current supply so that all rectifiers in the network in a conducting state at that instant are switched off and such that a variable supply is taken from the output of said network for feeding to the load, additional feedback rectifiers being connected in the network to thereby provide a path for any reactive current in the load when the controllable rectifiers are switched off, and means for feeding back any such reactive current as reactive power to at least one of said direct current supplies.

References Cited by the Examiner

UNITED STATES PATENTS

| | | | |
|---|---|---|---|
| 3,010,062 | 11/61 | Van Emden | 321—18 |
| 3,020,448 | 2/62 | Fefer. | |
| 3,047,789 | 7/62 | Lowry | 321—45 X |
| 3,074,008 | 1/63 | McPhail | 323—22 |
| 3,103,616 | 9/63 | Cole et al. | 321—45 |

OTHER REFERENCES

"G.E. S. R. C. Manual," First Edition, March 21, 1960, pp. 138 to 143.

LLOYD McCOLLUM, *Primary Examiner.*